G. G. F. BOSWELL.
FORM FOR CONCRETE CISTERNS, SEWERS, AND THE LIKE.
APPLICATION FILED NOV. 27, 1908.
952,066.
Patented Mar. 15, 1910.
2 SHEETS—SHEET 1.
Fig-1-
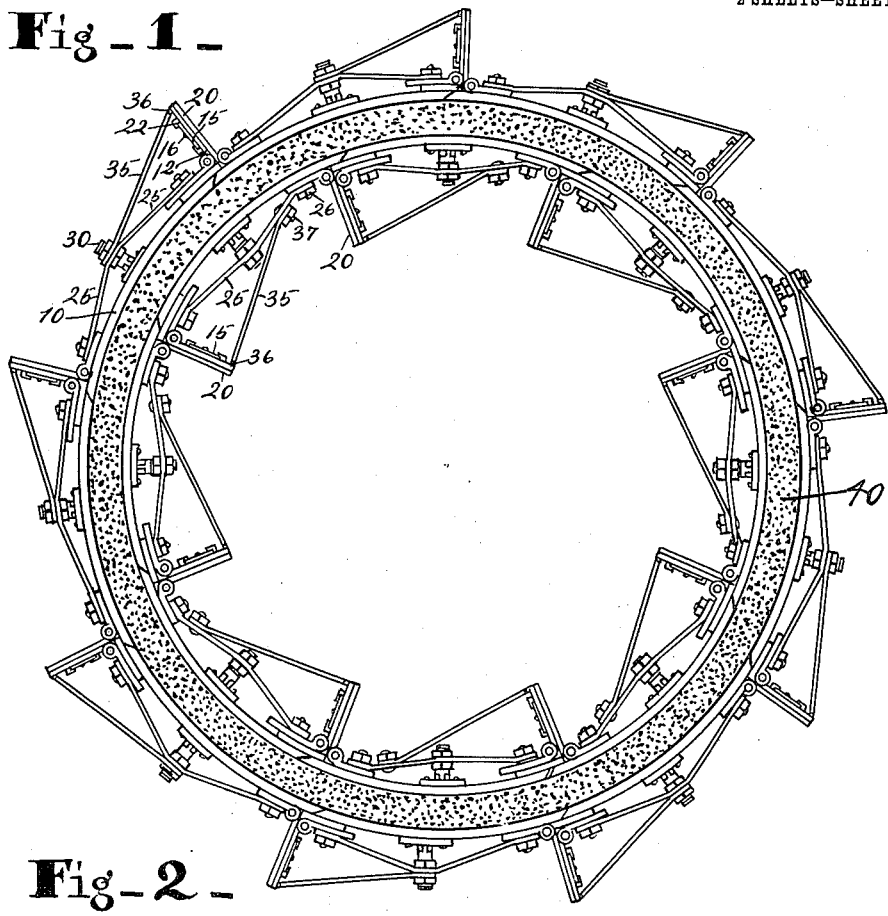
Fig-2-
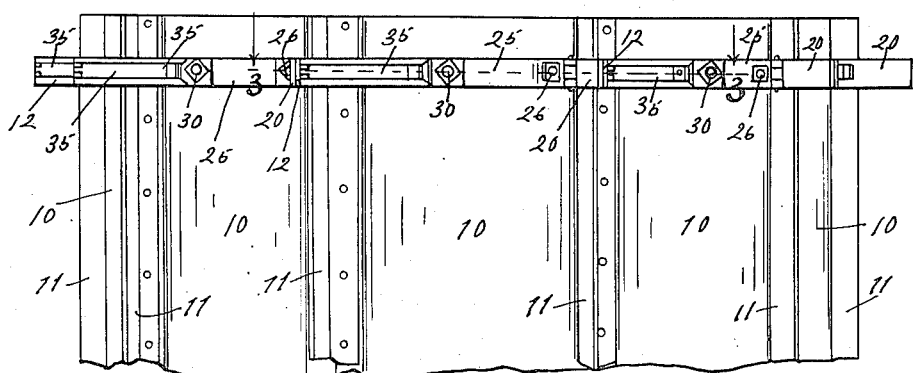
WITNESSES:
W. M. Gentle.
O. M. Greener.
INVENTOR.
George G. F. Boswell,
BY
V. H. Lockwood
ATTORNEY.

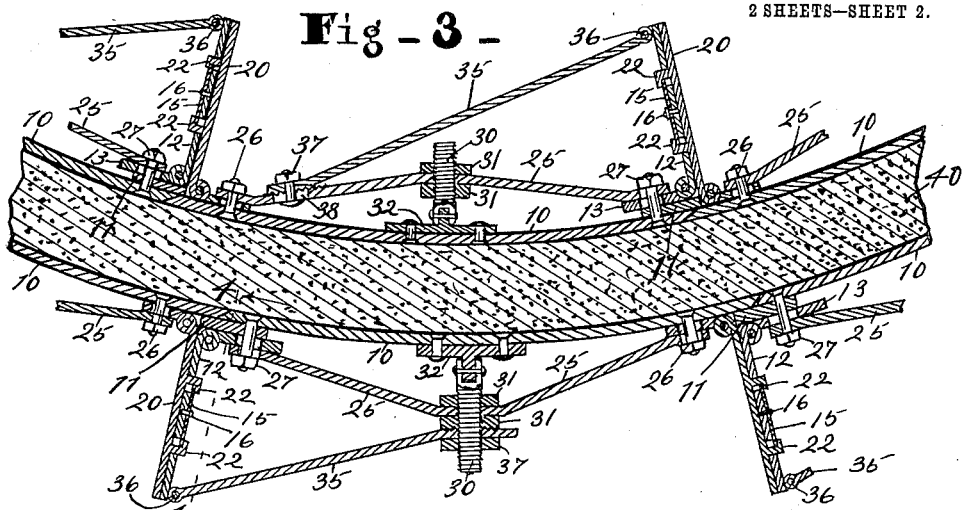
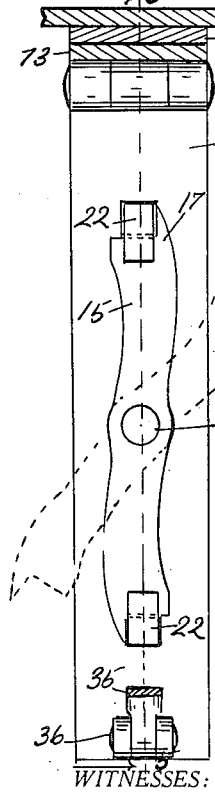
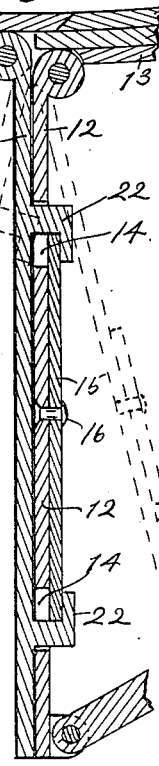
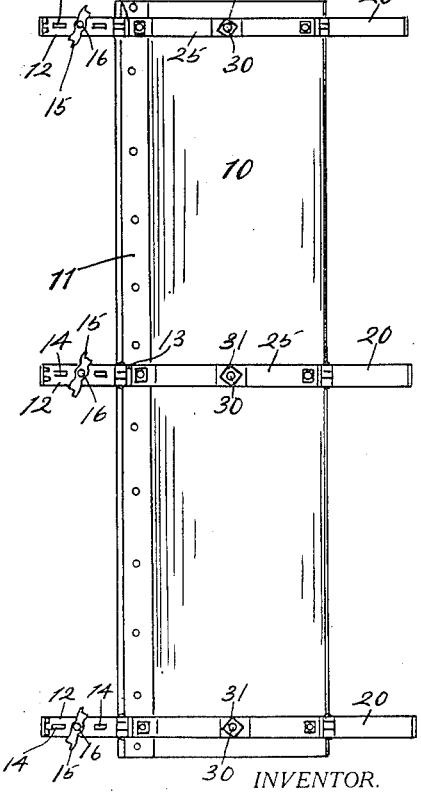

UNITED STATES PATENT OFFICE.

GEORGE G. F. BOSWELL, OF INDIANAPOLIS, INDIANA.

FORM FOR CONCRETE CISTERNS, SEWERS, AND THE LIKE.

952,066. Specification of Letters Patent. Patented Mar. 15, 1910.

Application filed November 27, 1908. Serial No. 464,638.

*To all whom it may concern:*

Be it known that I, GEORGE G. F. BOSWELL, of Indianapolis, county of Marion, and State of Indiana, have invented a certain new and useful Form for Concrete Cisterns, Sewers, and the Like; and I do hereby declare that the following is a full, clear, and exact description thereof, reference being had to the accompanying drawings, in which like figures refer to like parts.

The object of this invention is to improve the construction of mold forms for sewers, cisterns and the like, by way of simplicity, cheapness and ease of operation.

One feature of the invention consists in making up the form of sections, each section consisting of a curved segmental mold plate adapted to overlap the adjacent mold plates at the edges thereof, and a brace construction for said mold plates consisting of radially extending pivoted arms at the lateral edges of said plates, whereby the pivoted plates, flanges or plates of adjacent mold plates can be temporarily secured together.
Along with the foregoing is the provision of a brace from one of said pivoted plates to the opposite side or edge of said mold plate arranged adjustably so the brace will be adapted to any degree of curvature of said mold plate.

Another feature of the invention consists in combining with said mold plate a transversely extending bar secured to the opposite edges or sides of said mold plate and a screw or the like operating about midway of said mold plate for bending or controlling the curvature thereof.

The full nature of this invention will be understood from the accompanying drawings and the following description and claims.

In the drawings Figure 1 is a cross section of one of the forms adapted for building a cistern or the like. Fig. 2 is an elevation of what appears in Fig. 1, part being broken away. Fig. 3 is a section on the line 3—3 of Fig. 2 and on a larger scale. Fig. 4 is a section on the line 4—4 of Fig. 3 on a still larger scale. Fig. 5 is a section on the line 5—5 of Fig. 4, the altered position of parts of Figs. 4 and 5 being shown by dotted lines. Fig. 6 is an elevation of one of the mold plates with its attached parts.

The form is made up of a number of sections similar in character. Each of these sections consists of a mold plate 10 with the edges beveled as shown or otherwise formed so the edges of adjacent plates will overlap each other. These plates 10 may be as long as desired for forming the cistern or sewer a section at a time.

Along one edge of said plate 10, as seen in Fig. 6, there is a reinforcing strip 11 secured. This strip and the plate 10 constitute practically one solid plate. Along one edge of said mold plate 10 there are pivoted plates 12 hinged to pieces 13 secured upon said strip 11. In the form shown there are three of these pivoted plates 12, pivoted so as to project at a right angle or any desired angle from the mold plate. Each of the plates 12 has a pair of slots 14, see Fig. 5, and a latch bar 15 centrally pivoted on pin 16, so that the ends of the latch bar may project partially over the slots. The ends of the latch bar are preferably notched, as shown in Fig. 4, having a projection 17 at one side thereof.

Each mold plate 10 has on the other edge thereof pivoted plates 20 pivoted thereto. There are three of these in the form shown, one opposite each pivoted plate 12, and these pivoted plates 20 have tongue-like hooks 22 extending therefrom in position to extend through the slots 14 and the pivoted plate 12 when the two pivoted plates 12 and 20 are brought together in interlocking position, as shown in Fig. 5. The latch bar 15 is adapted to catch under the hooks 22 when the arms 12 and 20 are interlocked. It is thus seen that when the mold plates 10 are placed adjacent each other the pivoted plates 12 and 20 may be brought against each other and interlocked, as seen in Figs. 3, 4 and 5, and thereby said mold plates 10 may be secured together.

The braces for the mold plates are mounted thereon as follows. There are sector-like brace bars 25 secured transversely of the mold plate between the pivoted plates 12 and 20, as shown in Figs 3 and 6. They are secured to the mold plate by the bolts 26 and 27, the latter projecting through the braces 25, the piece 13 to which the arm 12 is pivoted, the reinforcing strip 11 and the mold plate 10, as seen in Fig. 3. The braces 25 have a screw 30 extending centrally through them with nuts 31 thereon, and on each of the braces 25 set screws are pivotally secured to the plate 32 that is riveted centrally to the mold plate 10. By turning the nuts 31 the curvature of the mold plate 10 may be modified and maintained in any desired degree of curvature. Another brace 35 is pivoted at 36 to the end of the arm 12 and it extends diagonally to the opposite edge of the mold plate 10 where it is connected with the other brace 25 by means of a bolt 37 projecting through the slot 38 in the brace 25, whereby the attachment of the brace 35 may be adjusted. The arrangement of these sections in a sewer form is shown in Fig. 1, there being an inner and outer mold spaced apart and the intermediate space filled with cement 40. The mold sections are removed or collapsed by merely disengaging the latch bars 15, which releases the connection between the adjacent plates so that the mold sections can be lifted away.

In forming a sewer it is observed that with this construction of a mold the interior space within the sewer is practically open so that anyone can enter it for the purpose of releasing and removing the mold sections. In making a circular sewer the mold sections would be arranged substantially as shown in Fig. 1, excepting that no mold sections would be needed in the upper part of the structure on the outside.

What I claim as my invention and desire to secure by Letters Patent is:

1. A mold form for concrete cisterns, sewers and the like made up of mold plates adapted to be placed with their edges adjacent successively, pivoted plates on the adjacent edges of said mold plates and adapted to lie against each other, means for temporarily securing said adjacent pivoted plates together and means for changing and maintaining the curvature of said mold plates.

2. A mold form for concrete cisterns, sewers and the like made up of mold plates adapted to be placed with their edges adjacent successively, pivoted plates on the adjacent edges of said mold plates adapted to lie against each other, one of said pivoted plates being provided with slots, and a latch bar pivoted on said pivoted plate, the other adjacent pivoted plate being provided with hooks adapted to extend through said slots and be engaged by said latch bar for temporarily holding the pivoted plates together.

3. A mold form for concrete cisterns, sewers and the like made up of mold plates adapted to be placed with their edges adjacent successively, pivoted plates on the adjacent edges of said mold plates adapted to lie against each other, means for temporarily securing said adjacent pivoted plates together, and means for changing and maintaining the curvature of said mold plates and braces extending from one side or edge of each mold plate to the ends of said pivoted plates at the other side of the same mold plate.

4. A mold form for concrete cisterns, sewers and the like made up of mold plates adapted to be placed with their edges adjacent successively, pivoted plates on the adjacent edges of said mold plates adapted to lie against each other, means for temporarily securing said adjacent pivoted plates together, braces extending transversely of each mold plate and between said pivoted plates, and a screw mounted about midway of said braces that is adapted to press the mold plate and press the braces apart.

5. A mold form for concrete cisterns, sewers and the like made up of mold plates adapted to be placed with their edges adjacent successively, pivoted plates on the adjacent edges of said mold plates adapted to lie against each other, means for temporarily securing said adjacent pivoted plates together, braces extending transversely of each plate and between said pivoted plates, screws pivotally connected with the mold plate about midway thereof that project through the braces, and nuts thereon whereby the mold plate and braces may be pressed apart and maintained in their adjusted positions.

In testimony whereof, I have hereunto affixed my signature in the presence of the witnesses herein named.

GEORGE G. F. BOSWELL.

Witnesses:
  O. M. GREENER,
  O. M. McLAUGHLIN.